(12) United States Patent
Legerton (10) Patent No.: US 8,388,130 B2
(45) Date of Patent: Mar. 5, 2013

(54) NON-DEFORMING CONTACT LENS (75) Inventor: Jerome A. Legerton, San Diego, CA (US)

(73) Assignee: Vicoh, LLC, San Diego, CA (US)

( * ) Notice: Subject to any disclaimer, the term of this patent is extended or adjusted under 35 U.S.C. 154(b) by 517 days.

(21) Appl. No.: 12/264,092

(22) Filed: Nov. 3, 2008

(65) Prior Publication Data
US 2010/0110382 A1 May 6, 2010

(51) Int. Cl.
G02C 7/00 (2006.01)
G02C 7/02 (2006.01)
G02C 7/04 (2006.01)

(52) U.S. Cl. .................................................. 351/159.23
(58) Field of Classification Search .............. 351/160 R, 351/161–162, 160 H, 159.2–159.23, 159.73, 351/159.78
See application file for complete search history.

(56) References Cited

U.S. PATENT DOCUMENTS

| 3,482,906 | A | 12/1969 | Volk |
| 3,684,357 | A | 8/1972 | Tsuetaki |
| 3,973,837 | A | 8/1976 | Page |
| 3,973,838 | A | 8/1976 | Page |
| 4,194,815 | A | 3/1980 | Trombley |
| 4,208,362 | A | 6/1980 | Deichert et al. |
| 4,943,150 | A | 7/1990 | Deichert et al. |
| 5,151,723 | A * | 9/1992 | Tajiri ............................ 351/161 |
| 5,450,145 | A | 9/1995 | Valentine |
| 5,570,142 | A * | 10/1996 | Lieberman ................ 351/160 R |
| 5,790,235 | A | 8/1998 | Kirschbaum |
| 5,880,809 | A * | 3/1999 | Lieberman et al. ....... 351/160 R |
| 6,241,355 | B1 * | 6/2001 | Barsky ........................... 351/177 |
| 6,491,393 | B1 | 12/2002 | Appleton |
| 7,431,455 | B2 | 10/2008 | Chernyak |
| 2002/0093623 | A1 | 7/2002 | Duppstadt |
| 2005/0203619 | A1 | 9/2005 | Altmann |
| 2005/0280777 | A1 | 12/2005 | Dai |
| 2006/0023162 | A1 | 2/2006 | Azar et al. |
| 2007/0091259 | A1 | 4/2007 | Svochak |
| 2007/0291224 | A1 | 12/2007 | Lai |
| 2008/0007694 | A1 | 1/2008 | Wei et al. |
| 2008/0013043 | A1 | 1/2008 | Ye |
| 2008/0100612 | A1 | 5/2008 | Dastmalchi et al. |
| 2008/0212020 | A1 | 9/2008 | Legerton |

FOREIGN PATENT DOCUMENTS

EP 0 445 994 9/1991

* cited by examiner

Primary Examiner — James Greece
(74) Attorney, Agent, or Firm — Sheppard Mullin Richter & Hampton LLP (57) ABSTRACT The present invention is directed to a non-deforming contact lens comprising a central zone and a peripheral zone, wherein the central zone has a radius of curvature approximately equivalent to a central curvature of an underlying cornea, wherein the central zone is progressively aspheric with an initial zone approximately elliptical and then progressing to a parabolic shape and then to a hyperbolic shape. The peripheral zone reverses the progressive asphericity of the central zone, and includes a terminating local radius that is shorter than a radius at a junction of the central zone and the peripheral zone.

15 Claims, 6 Drawing Sheets

NON-DEFORMING CONTACT LENS

FIELD OF THE INVENTION

The present invention relates generally to contact lenses and ophthalmic methods. More particularly, the present invention relates to non-deforming contact lenses, and methods therefor.

BACKGROUND OF THE INVENTION

Contact lenses were described by Leonardo da Vinci as early as the 1500s. Early contact lenses were made from optical glass between 1920 and 1940. These lenses were prescribed by the Royal Air Force in Britain during World War II to try to increase the number of pilots by correcting the vision of otherwise acceptable candidates. Unfortunately, these contact lenses were uncomfortable to wear and caused significant eye irritation. Such factors resulted in short wearing times.

Early contact lens designs fused two materials—glass over the cornea and plastic over the scleral portion of the eye. Various configurations, including channels for tears and air availability to the cornea, were tried in order to improve comfort and wearing time. Transparent plastic was introduced in the mid-thirties and became the primary material in contact lenses. As development progressed the lenses became smaller as it was discovered that a corneal contact lens was all that was required to properly correct a user's vision.

Comfort increased dramatically with the introduction of hydrogel contact lenses. These lenses have been available for three decades and have undergone considerable improvement. Initially, the lenses were suitable only for patients with a minimal amount of astigmatism, since the first soft contact lenses did not correct for astigmatism. Later developments provided lenses with weighting systems or thicker portions to force the lens to rest on the eye in the orientation required to correct the patient's astigmatism. Further developments have led to the development of bifocal and multifocal contact lenses for patients with presbyopia.

All of the soft contact lenses described above have spherical and/or aspherical posterior surfaces with one or more zones. In each case these lenses have utilized a central radius of curvature that is flatter than the central radius of curvature of the eye to which the lens is fitted. In addition, the total sagittal depth of the lens and the volume of the lens exceed the sagittal depth and volume of the eye to which the lens was fitted. As a result, the lens deforms on the eye.

Lens deformation plays a significant role in the comfort and visual acuity of the wearer. Hydrogel materials change dimensionally as the water content varies, particularly as the lens becomes drier. These environmentally induced dimensional changes result in a decrease in the radial and linear dimensions as the water content decreases. Lenses with a sagittal height and volume greater than that of the underlying eye decrease in radius and thereby increase in sagittal height as the water content decreases during wear. This change induces an increased deformation as the dimensions of the lens move further away from the dimensions of the eye fitted for the lens.

Currently, work is underway to produce lenses providing higher order aberration correction for the purpose of allowing the human retina and brain to achieve maximum visual acuity. Higher order aberration corrections often deviate only fractions of a micron from a sphere over the diameter of the eye pupil. The magnitude of change in contact lens optics due to lens deformation easily exceeds the magnitude of the correction for higher order aberrations.

A non-deforming contact lens must accommodate the full corneal diameter as well as the region of the sclera over which the lens is fitted. This requires that the corneal surface be measured precisely. Recent efforts have been made to use corneal topography to design contact lenses. These efforts have been limited by the size of the cornea that can be measured with computer assisted video keratography. The average diameter that can be measured by placido systems is approximately 9 mm.

SUMMARY OF THE INVENTION

A non-deforming contact lens is provided. The lens includes a central zone having a radius of curvature approximately equivalent to a central curvature of an underlying cornea, wherein the central zone is progressively aspheric with an initial zone approximately elliptical and then progressing to a parabolic shape and then to a hyperbolic shape; and a peripheral zone that reverses the progressive ashpericity of the central zone to a terminating local radius shorter than a radius at a junction of the central zone and the peripheral zone.

DETAILED DESCRIPTION

In the following paragraphs, the present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

A. Non-Deforming Contact Lens of the Present Invention

Figure 1:
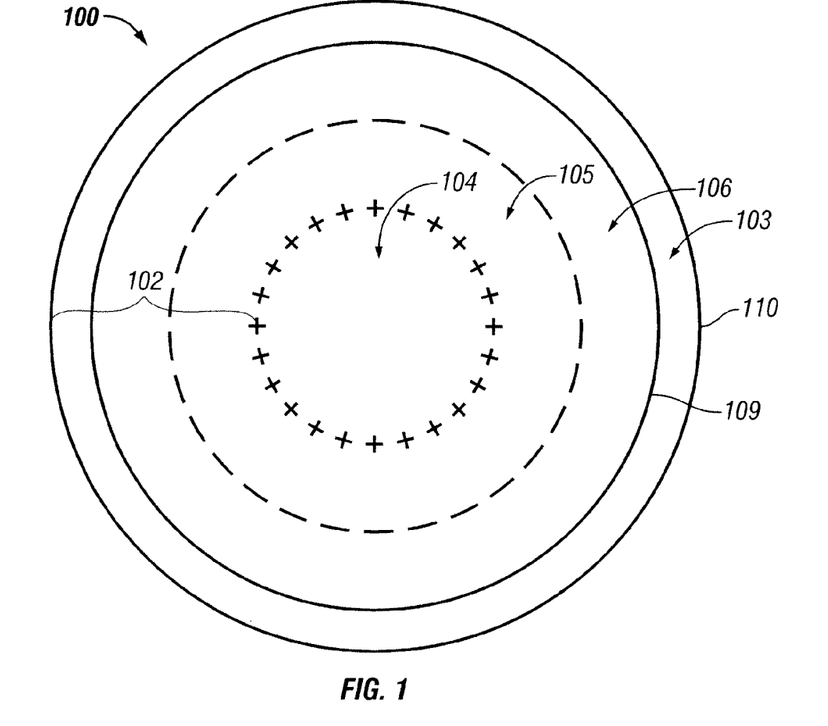
FIG. 1 is frontal view of a non-deforming contact lens according to an embodiment of the invention.

Referring now to the figures, which are illustrative of multiple embodiments of the present invention only and are not for purposes of limiting the same, FIG. 1 depicts a non-deforming contact lens 100 in accordance with one embodiment of the present invention. The non-deforming contact lens 100 has a central radius of curvature that is approximately equivalent to the central curvature of the underlying cornea. The non-deforming contact lens 100 generally includes a central zone 102 surrounded circumferentially by a peripheral zone 103.

With continued reference to FIG. 1, the central zone 102 is progressively aspherical, having a middle portion 104 that is approximately elliptical, and then becoming progressively aspherical along the posterior surface of the lens 100 from the middle portion 104 toward a parabolic intermediate transition zone 105, and then to a hyperbolic peripheral zone 106. In other words, the central zone 102 is substantially spherical in its center, then becoming elliptical, parabolic, and finally hyperbolic at the junction 109 between the central zone 102 and peripheral zone 103. As such, the central zone 102 includes at least two conic sections.

The peripheral zone 103 is progressively spherical from the junction 109 of the central zone 102 and the peripheral zone 103 toward the outer edge 110 of the non-deforming contact lens 100. Accordingly, the peripheral zone 103 reverses the progressive asphericity of the central zone 102 to have a terminating local radius or slope that is shorter than the local radius or slope at the junction 109. The peripheral zone 103 has an initial local slope or radius shorter than the terminating local slope or radius of the central zone 102. As will be understood by those of skill in the art, the central zone 102 is not limited to the particular zones enumerated above. For example, additional zones or fewer zones may be employed to approximate the curve of a particular eye of a patient. Such alternative configurations are contemplated by the invention. In this manner, the lens can be customized to approximate the biometric shape of the underlying eye without deformation.

Figure 2:
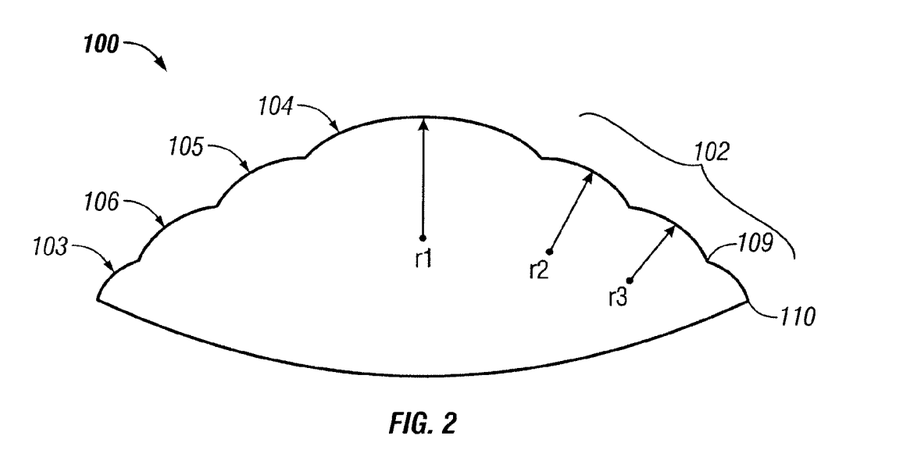
FIG. 2 is a side view of the non-deforming contact lens of FIG. 1 according to an embodiment of the invention.

FIG. 2 illustrates a side view of the non-deforming lens 100 of FIG. 1 according to an embodiment of the invention. In the illustrated embodiment, R1 is the local radius of the middle portion 104 of the central zone 102, R2 is the local radius of the parabolic intermediate transition zone 105, and R3 is the local radius of the hyperbolic zone 106.

B. Methods of Fitting

A continuum of methods of fitting may be utilized to fit the non-deforming soft contact lens described herein. All conventional contact lenses are fitted with a sagittal depth and volume that exceeds that of the underlying eye. Therefore, a conventional soft contact lens must deform to be in proximity to the eye. In contrast, the non-deforming contact lens of the invention has less volume for the same sagittal depth. This prevents the lens from deforming when worn. Eye care practitioners are trained to use a central keratometry measurement to determine the suggested radius of curvature for rigid and soft contact lenses. This value may be used to fit the non-deforming lens of the invention, wherein the central keratometry value determines the apical radius of the lens and the progressive geometry is based on the known mean biometric values.

A more complex method may utilize the central keratometry value and the measured value of the horizontal visible iris diameter. These two factors assist in the determination of the sagittal height of the cornea from the cornea-scleral junction to the apex of the cornea and the resultant progressive geometry from the apex to the junction at the limbus.

Corneal topography may also be used to determine the apical radius and the average eccentricity to the widest accurate chord diameter along with the horizontal visible iris diameter. In this manner the mathematics of the central elliptical and parabolic zones of the progressive geometry may be refined. Rasterizing and Fourier methods used in topography may be useful to provide additional biometric data beyond the chord diameter of the data provided by placido based methods. In addition, optical coherence tomography may be employed to determine the progressive geometry of the cornea, the cornea-scleral junction and the sclera.

Once the posterior geometry of the lens is determined, the anterior curvature of the lens may be calculated using the posterior apical radius, the index of refraction, the known manifest refraction and the vertex distance used in the manifest refraction. Higher order aberration correction for that induced by the posterior geometry may be added to the anterior surface geometry.

Figure 3:
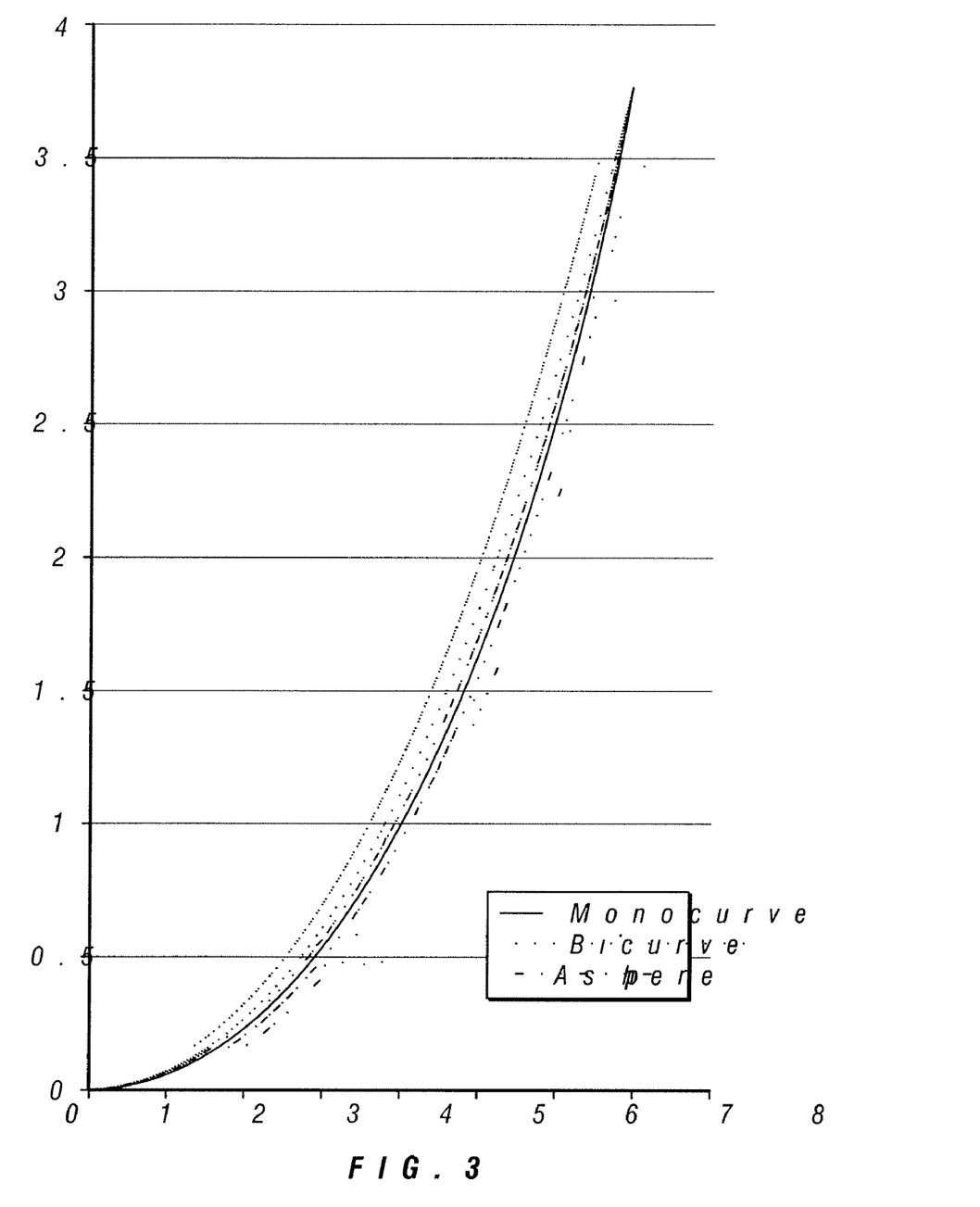
FIG. 3 is a diagram illustrating the differences between conventional monocurve, bicurve, and aspheric lenses.
Figure 4:
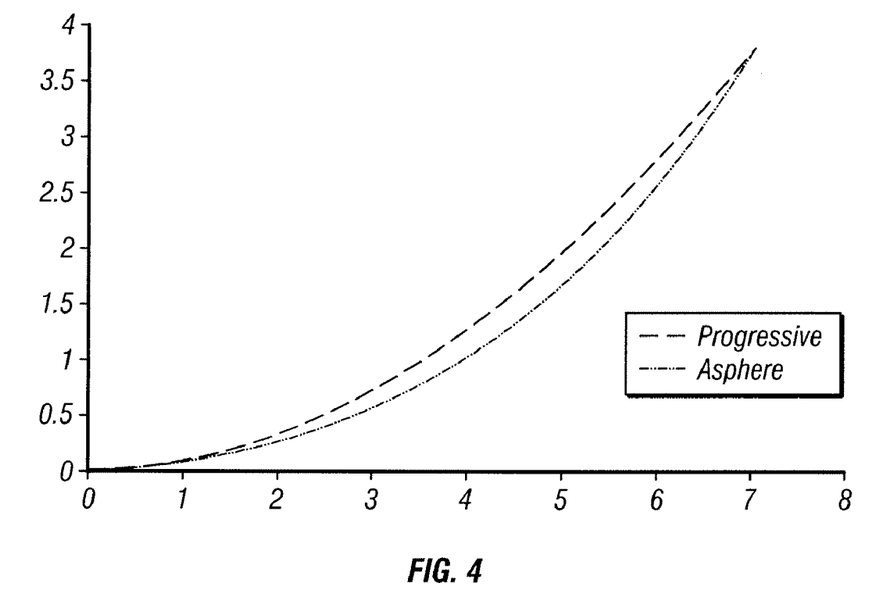
FIG. 4 is a diagram illustrating the difference between a progressive lens and an aspheric lens according to an embodiment of the invention.
Figure 5:
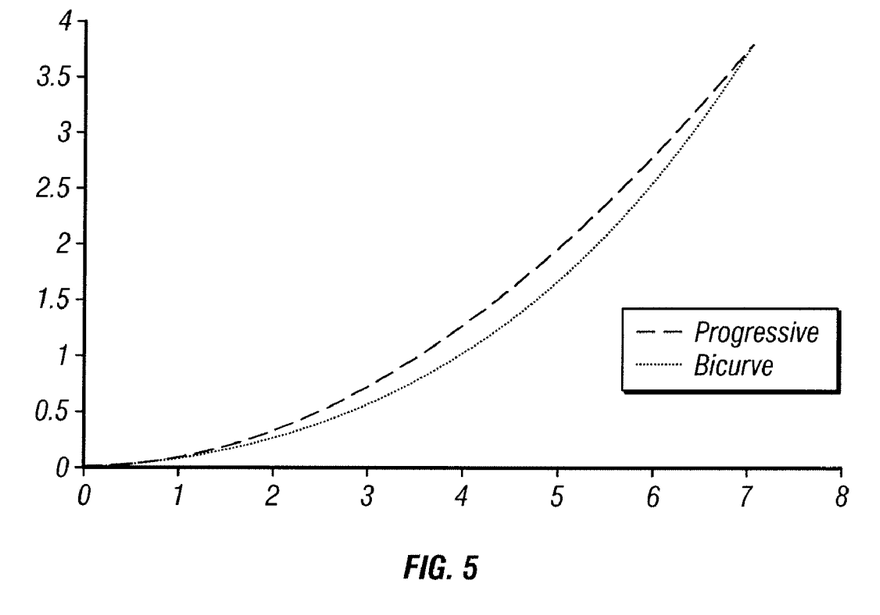
FIG. 5 is a diagram illustrating the difference between a bicurve lens and a progressive lens according to an embodiment of the invention.
Figure 6:
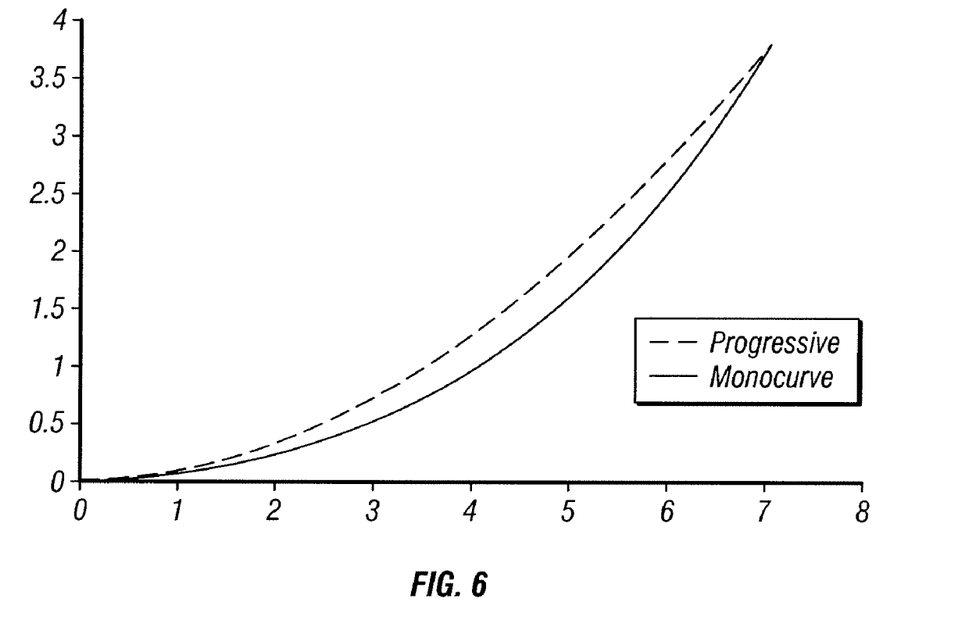
FIG. 6 is a diagram illustrating the difference between a monocurve lens and a progressive lens according to an embodiment of the invention.
Figure 7:
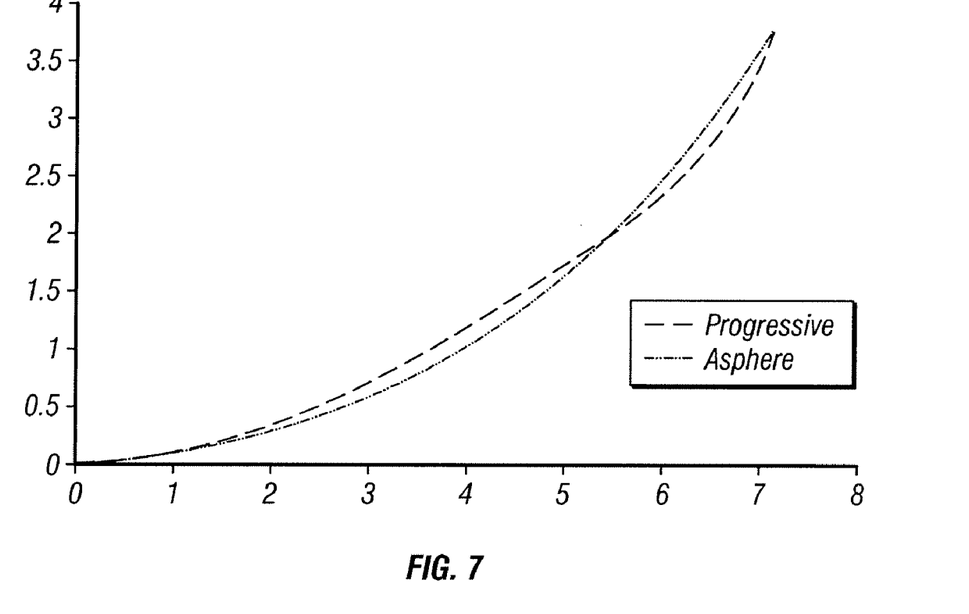
FIG. 7 is a diagram illustrating the difference between a progressive lens and an aspheric lens according to another embodiment of the invention.

FIGS. 3-6 are diagrams illustrating differences between the progressive non-deforming contact lens and moncurve, bicurve, and progressive lenses. In particular, FIG. 3 provides a comparison of monocurve, bicurve, and aspheric values over the lens. FIG. 4 is a diagram illustrating differences in radius values between a progressive radius non-deforming contact lens of the invention and a conventional aspherical lens. FIG. 5 illustrates differences in radius values between a conventional bicurve lens and a progressive lens of the invention, while FIG. 6 illustrates differences in radius values between a conventional monocurve lens and a progressive lens of the invention. FIG. 7 is a diagram illustrating differences in radius values between a progressive radius non-deforming contact lens having a peripheral zone with a shorter radius than the termination of the central zone according to another embodiment of the invention.

C. Additional Embodiments

Additional embodiments of the invention involve non-deforming lenses that incorporate correction for astigmatism. Refractive astigmatism is the result of the combination of corneal astigmatism and intra ocular astigmatic errors. As a rule, refractive astigmatism varies from corneal astigmatism due to the intraocular component. Javal's rule suggests the average intraocular component is about 0.75 D. It is known to vary in a normal distribution.

Figure 8:
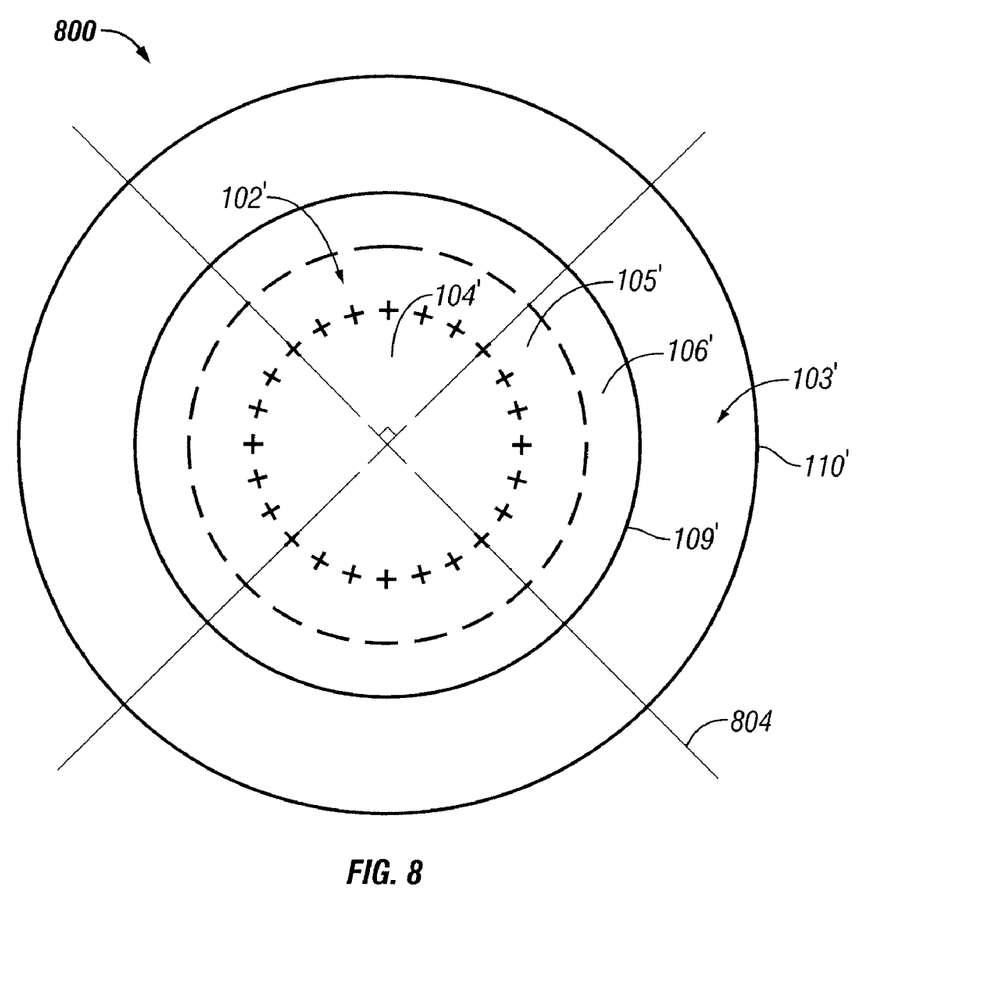
FIG. 8 is a perspective view of a non-deforming contact lens for correcting astigmatism according to an embodiment of the invention.

FIG. 78 illustrates a non-deforming contact lens 7800 for astigmatism that is similar in some regards to the lens 100 of FIGS. 1 and 2, wherein like elements have been labeled accordingly. Specifically, the non-deforming contact lens 7800 for astigmatism features a central zone 102' and a peripheral zone 103' that meet at junction 109'. The central zone 102' includes a middle portion 104', a parabolic intermediate transition zone 105', and a hyperbolic zone 106". Also illustrated are two principle meridians 7802, 7804 that are 90 degrees apart. The posterior curvature of the two principle meridians 7802, 7804 varies according to the local geometry in each meridian 7802, 7804. In particular, each meridian 7802, 7804 has a progressive geometry based on the apical radius of the respective meridian 7802, 7804.

The non-deforming contact lens 7800 for astigmatism illustrated in FIG. 78 obviates the need to utilize prism ballasting or thickness variation (as found in conventional toric lenses) to provide orientational stability. The meridional differences in geometry allow the lens 7800 to conform to the eye for maintaining stability in eyes having corneal astigmatism. Some eyes have no corneal astigmatism, while having refractive astigmatism due to the intraocular components. Conventional methods of providing rotational stability may be employed in such cases.

With further reference to FIG. 78, the anterior surface of the non-deforming contact lens 7800 for astigmatism will require an astigmatic correction to fully correct the refractive error of the eye when the corneal and refractive astigmatism vary to the degree of being clinically significant. The amount and orientation of the anterior astigmatic correction may be calculated or may be derived from measurement over a lens having only the back surface geometry with meridional difference and having a spherical front surface. The spherocylindrical over-refraction along with the orientation of the lens 7800 on the eye relative to the two posterior principle meridians provides the information required to determine the front surface curvatures of the lens 7800.

Figure 9:
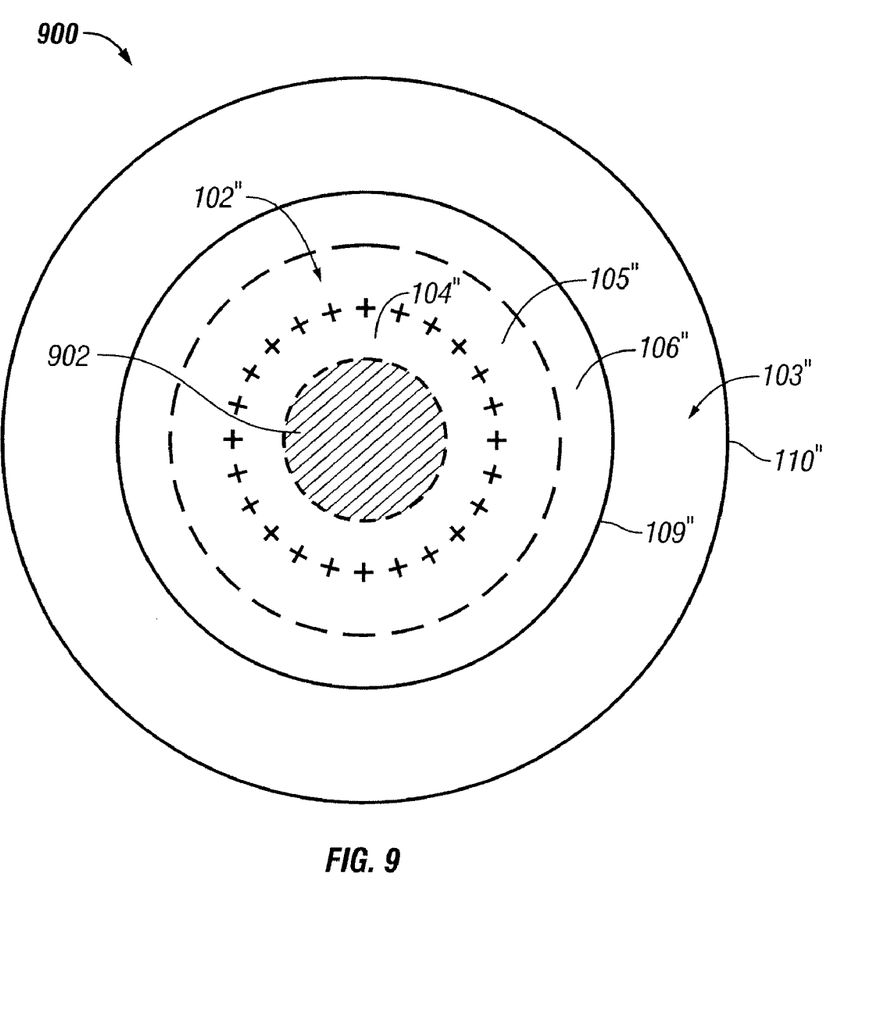
FIG. 9 is a frontal view of a non-deforming contact lens for bifocal and multifocal correction according to an embodiment.

A further embodiment of the invention is depicted in FIG. 8. Specifically, a non-deforming contact lens 800 provides for bifocal or multifocal correction. The lens 800 is similar in some regards to the lens 100 of FIGS. 1 and 2, and like elements have been labeled accordingly. Similar to previous embodiments, the lens 800 includes a central zone 102" and a peripheral zone 103" that meet at junction 109". The central zone 102" includes a middle portion 104", a parabolic intermediate transition zone 105", and a hyperbolic zone 106".

With continued reference to FIG. 89, the non-deforming contact lens 8900 provides for bifocal or multifocal correction may feature the same back surface geometry as the single vision (non-bifocal or multifocal) designs. The bifocal or multifocal correction is incorporated in the anterior surface of the lens 8900, as shown by element 8902 located in the middle portion 104" of the central zone 102". The area of correction 8902 may have a center distance or center near design. Additionally, the lens 8900 may have central and peripheral zones 102", 103" comprising two spherical curvatures, two aspherical curvatures, or a combination of spherical and aspherical curvatures. The size of the central and peripheral zones 102", 103" may be determined by pupil size or by arbitrary means. The central zone 102" may be displaced to compensate for the deviation of the geometric center of the lens from the center of the pupil or the deviation of the geometric center of the lens from the line of sight.

A still further embodiment provides for correction of higher order aberrations of the lens-eye system. The lens-eye system may have higher order aberrations that result from the aberrations of the eye, the aberrations of the lens, and/or the aberrations from the position of the lens on the eye. The non-deforming lens may fortuitously correct some of the aberrations of the eye due to the progressive geometry of the posterior surface. At the same time, the lens may induce new aberrations. One method of determining the residual lens eye aberrations is to conduct an over-refraction test using an aberrometer. In this manner, the anterior or posterior surface of the lens may be modified to correct residual lens-eye aberrations.

The most significant aberration of the modal lens-eye system is spherical aberration. Spherical aberration may be corrected without the use of over-refraction with an aberrometer. The spherical aberration of the eye is measured by conventional means using the aberrometer and the spherical aberration of the lens is calculated by conventional means using the apical radius and conic constant over the central zone of the posterior surface and the lens power. The anterior curvature may then be calculated to produce the desired spherical aberration of the lens-eye system. In some cases the desired amount may be zero or the lens-eye system may be best corrected with a prescribed amount of positive spherical aberration.

Thus, it is seen that non-deforming contact lenses are provided. One skilled in the art will appreciate that the present invention can be practiced by other than the various embodiments and preferred embodiments, which are presented in this description for purposes of illustration and not of limitation, and the present invention is limited only by the claims that follow. It is noted that equivalents for the particular embodiments discussed in this description may practice the invention as well.

While various embodiments of the present invention have been described above, it should be understood that they have been presented by way of example only, and not of limitation. Likewise, the various diagrams may depict an example architectural or other configuration for the invention, which is done to aid in understanding the features and functionality that may be included in the invention. The invention is not restricted to the illustrated example architectures or configurations, but the desired features may be implemented using a variety of alternative architectures and configurations. Indeed, it will be apparent to one of skill in the art how alternative embodiments may be implemented to achieve the desired features of the present invention. Also, a multitude of different constituent part names other than those depicted herein may be applied to the various parts of the devices. Additionally, with regard to operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent.

The invention claimed is:

1. A non-deforming contact lens, comprising:
   a posterior surface having an optical structure including a central zone having a radius of curvature approximately equivalent to a central curvature of an underlying cornea, wherein the central zone is progressively aspherical from a middle portion of the central zone toward an outer port on of the central zone. wherein the central zone includes at least two conic sections; and
   a peripheral zone that reverses the progressive asphericity of the central zone.

2. The non-deforming contact lens of claim 1, wherein the peripheral zone includes a commencing local radius that is shorter than the terminating radius of the central zone at the junction of the central zone and the peripheral zone.

3. The non-deforming contact lens of claim 1, further comprising:
   two major orthogonal meridians conforming to principal meridians of an astigmatic cornea.

4. The non-deforming contact lens of claim 3, wherein the lens further comprises prism ballasting for orientational stability.

5. The non-deforming contact lens of claim 3, wherein the lens further comprises thickness variation for orientational stability.

6. The non-deforming contact lens of claim 1, further comprising:
   an anterior lens surface containing a bifocal correction.

7. The non-deforming contact lens of claim 1, further comprising:
   an anterior lens surface containing a multi-focal correction.

8. The non-deforming contact lens of claim 1, further comprising:
   an anterior lens surface containing a correction for neutralizing low and higher order aberrations of a lens and eye system.

9. A non-deforming concact lens, comprising:
   a posterior surface having an optical structure including a central zone having a radius of curvature approximately equivalent to a central curvature of an underlying cornea, wherein the central zone is progressively aspheric with an initial zone approximately elliptical and then progressing to a parabolic shape and then to a hyperbolic shape; and
   a peripheral zone that reverses the progressive asphericity of the central zone, the peripheral zone having a terminating local radius that is shorter than a radius at a junction of the central zone and the peripheral zone.

10. The non-deforming contact lens of claim 9, further comprising:
    two major orthogonal meridians conforming to principal meridians of an astigmatic cornea.

11. The non-deforming contact lens of claim 10, wherein the lens further comprises prism ballasting.

12. The non-deforming contact lens of claim 10, wherein the lens further comprises thickness variation.

13. The non-deforming contact lens of claim 9, further comprising:
    an anterior lens surface containing a bifocal correction.

14. The non-deforming contact lens of claim 9, further comprising:
    an anterior lens surface containing a multi-focal correction.

15. The non-deforming contact lens of claim 9, further comprising:
    an anterior lens surface containing a correction for neutralizing low and higher order aberrations of a lens and eye system.

* * * * *